(12) United States Patent
Mueller et al.

(10) Patent No.: US 8,224,316 B2
(45) Date of Patent: Jul. 17, 2012

(54) CONTROL DEVICE FOR SHIELDING A ROOM

(75) Inventors: Jan Mueller, Hamburg (DE); Joerg Pump, Hamburg (DE); Sven Knefelkamp, Wedel (DE)

(73) Assignee: Airbus Operations GmbH, Hamburg (DE)

( * ) Notice: Subject to any disclaimer, the term of this patent is extended or adjusted under 35 U.S.C. 154(b) by 26 days.

(21) Appl. No.: 12/964,183

(22) Filed: Dec. 9, 2010

(65) Prior Publication Data

US 2011/0159798 A1    Jun. 30, 2011

Related U.S. Application Data

(62) Division of application No. 12/309,944, filed as application No. PCT/EP2007/006859 on Aug. 2, 2007.

(60) Provisional application No. 60/821,150, filed on Aug. 2, 2006.

(30) Foreign Application Priority Data

Aug. 2, 2006  (DE) .......................... 10 2006 036 082

(51) Int. Cl.
*H04K 3/00* (2006.01)
*H04B 7/185* (2006.01)
*H04B 17/00* (2006.01)
*H04W 4/00* (2009.01)

(52) U.S. Cl. ...................... 455/431; 455/67.13; 455/427; 455/12.1; 455/1

(58) Field of Classification Search .............. 455/1, 12.1, 455/431, 429, 67.1, 226.1
See application file for complete search history.

(56) References Cited

U.S. PATENT DOCUMENTS

| | | | | |
|---|---|---|---|---|
| 5,230,085 A * | 7/1993 | Loposer | ................ | 455/41.2 |
| 5,884,166 A * | 3/1999 | Ray et al. | ................ | 455/431 |
| 6,185,430 B1 * | 2/2001 | Yee et al. | ................ | 455/519 |
| 6,269,243 B1 * | 7/2001 | Corbefin et al. | ............ | 455/431 |
| 6,477,152 B1 | 11/2002 | Hiett | | |
| 6,687,506 B1 | 2/2004 | Girod | | |
| 6,959,192 B1 | 10/2005 | Cannon et al. | | |
| 7,054,594 B2 * | 5/2006 | Bloch et al. | ................ | 455/41.2 |
| 7,136,621 B2 * | 11/2006 | de La Chapelle et al. | ... | 455/13.2 |
| 7,177,638 B2 * | 2/2007 | Funderburk et al. | .......... | 455/431 |
| 7,187,927 B1 * | 3/2007 | Mitchell | ................ | 455/431 |
| 7,280,825 B2 * | 10/2007 | Keen et al. | ................ | 455/431 |
| 7,343,157 B1 * | 3/2008 | Mitchell | ................ | 455/431 |
| 7,395,084 B2 * | 7/2008 | Anttila | ................ | 455/552.1 |
| 7,437,125 B2 * | 10/2008 | McLain et al. | ................ | 455/13.4 |

(Continued)

FOREIGN PATENT DOCUMENTS

DE          698 01 284 T2    6/2002

(Continued)

OTHER PUBLICATIONS

International Search Report issued on Nov. 30, 2007 in connection with corresponding International Appln. No. PCT/EP2007/006859.

(Continued)

*Primary Examiner* — Tilahun B Gesesse
(74) *Attorney, Agent, or Firm* — Lerner, David, Littenberg, Krumholz & Mentlik, LLP (57) ABSTRACT

A control device that shields a room from incoming signals includes an interference device which is adapted for querying an interference signal for rendering a signal that enters a room unrecognizable by superposition with the interference signal.

13 Claims, 5 Drawing Sheets

U.S. PATENT DOCUMENTS

| | | |
|---|---|---|
| 2002/0102968 A1 | 8/2002 | Arend et al. |
| 2002/0151278 A1 | 10/2002 | McLain et al. |
| 2004/0142658 A1* | 7/2004 | McKenna et al. ............ 455/11.1 |
| 2004/0229607 A1 | 11/2004 | La Chapelle et al. |
| 2005/0008223 A1 | 1/2005 | Zeng et al. |

FOREIGN PATENT DOCUMENTS

| | | |
|---|---|---|
| DE | 69900920 T2 | 11/2002 |
| EP | 0 932 266 A1 | 7/1999 |
| EP | 1217853 A2 | 6/2002 |
| GB | 2350972 A | 12/2000 |
| JP | 11261468 A | 9/1999 |
| JP | 2001010271 A | 1/2001 |
| JP | 2002094468 A | 3/2002 |
| JP | 2005191739 A | 7/2005 |
| RU | 2146851 C1 | 3/2000 |
| RU | 2215371 C2 | 10/2003 |
| WO | 9428684 A1 | 12/1994 |
| WO | 0115337 A1 | 3/2001 |
| WO | 0180450 A1 | 10/2001 |
| WO | 03101011 A1 | 12/2003 |
| WO | 03107564 A1 | 12/2003 |
| WO | 2006002094 A2 | 1/2006 |

OTHER PUBLICATIONS

Office Action from Japanese Application No. 2009-522179, dated Nov. 8, 2011.

* cited by examiner

| | CDMA 450 (420 MHz) (item 1) | CDMA 450 (460 MHz) (item 2) | GSM 850 (item 4) | GSM 900 (item 5) | GSM 1800 (item 7) | GSM 1900 (item 8) | UMTS 2000 (item 9) | UMTS 2.6 GHz (item 10) |
|---|---|---|---|---|---|---|---|---|
| Europe | X | X | | X | X | | X | X |
| Poland | X | X | X | X | X | | X | |
| Russia | X | X | X | X | X | | X | |
| Middle East | | | X | X | X | | X | |
| Africa | X | | X | X | X | | | |
| US and Canada | | X | X | | X | X | | |
| Asia | X | X | X | X | X | X | X | |
| Asia Pac Australia, Japan* | X | X | X | X | X | X | X | X |
| South America | X | X | X | X | X | X | | |
| Brazil | X | X | X | X | X | X | | |

CONTROL DEVICE FOR SHIELDING A ROOM

CROSS-REFERENCE TO RELATED APPLICATIONS

This application IS A DIVISIONAL APPLICATION OF U.S. patent application Ser. No. 12/309,944 filed Nov. 18, 2009 which is a 35 U.S.C §371 National Stage entry of PCT/EP2007/006859, filed Aug. 2, 2007 which claims the benefit of the filing date of U.S. Provisional Patent Application No. 60/821,150 filed Aug. 2, 2006, and of German Patent Application DE 10 2006 036 082.6 filed Aug. 2, 2006, the disclosures of which are hereby incorporated herein by reference.

FIELD OF THE INVENTION

The present invention relates to the shielding of signals for a mobile radio system, in particular in an aircraft. Furthermore, the present invention in particular relates to a control device for shielding a room, to a system for shielding a room, to a method for shielding a room, and to an aircraft with a control device for shielding a room.
Technological Background In the course of the further development of the mobile radio technology or mobile radiotelephone technology, respectively and the wide distribution of mobile radio terminals or mobile radio end devices, respectively, it may be a desire of passengers of an airline to use the mobile phones or other portable electronic devices during a flight as well. However, up to now the use of passenger's proprietary portable electronic devices on board of aircrafts may be, as a rule, not allowed due to various factors. For example, the power necessary for the operation may generate electromagnetic radiation that might lead to the failure of systems in an aircraft. Furthermore, proper reception during a flight may not be ensured.

SUMMARY OF THE INVENTION

There may be a need to enable efficiently using mobile terminals in a room.

Accordingly, a control device for shielding a room or a space, respectively, a system for shielding a room, a method for shielding a room, and an aircraft comprising a control device for shielding a room are created.

In the following, the term transmitting device may be used for a sending device or transmitting device, respectively. According to an exemplary embodiment of the present invention, a control device for shielding a room is provided, wherein the control device comprises a receiving device, an interference device, and a sending device or transmitting device, respectively for an interference signal. Thereby, the receiving device is adapted such that the receiving device is capable receiving a transmission signal. Thereby, the transmission signal is a radio signal that is transmitted for communication purposes by a transmitting station and/or receiving station, a base station or a transmitting-receiving station outside the room. In the context of this document the term "transmission signal" refers to both the signal that is transmitted or sent by the base station and the signal that is received by the base station.

Thereby, the interference device is adapted such that the interference device determines an interference signal from the received transmission signal such that the transmission signal is interferable-with by the determined, detected or calculated interference signal in the case of superposition or that the transmission signal is interferable by superposing of received transmission signal with the interference signal. Furthermore, the transmitting device is adapted such that the transmitting device emits the interference signal determined in this manner.

According to a further exemplary embodiment of the present invention, a system for shielding a room is created or provided, wherein the system comprises a control device having the above-mentioned features. Furthermore, the system comprises a transmitting-receiving device inside the room, wherein the control device is adapted such that the control device receives a transmission signal coming from the exterior or from outside the room. This transmission signal is a radio signal. Furthermore, the control device is adapted such that the control device determines an interference signal from the received external transmission signal so that when the interference signal is emitted, the transmission signal is interfered with such that a signal of a local transmitting-receiving device is distinguishable from the interfered-with signal. The interference signal generated in this manner may be emitted by the control device. Emitting of the signal may take place in the room so that inside the room at least a part of the transmission signal, which transmission signal may enter the room may become the interfered-with signal. Thus, the entering transmission signal may be made unrecognisable.

According to a further exemplary embodiment of the present invention, a method for shielding a room is created or provided. According to this method a transmission signal is received. The transmission signal may be any kind of radio signal. For example, a transmission signal is a radio signal that may be emitted by a mobile radio base station, by a mobile phone base station or by a mobile radio terminal or by a mobile radio end device. After receipt of the transmission signal, an interference signal may be identified, established or determined from the received transmission signal, such that the transmission signal can be interferable with by emitting the interference signal. This determined interference signal may be finally emitted in order to cause interference to a part of the transmission signal that enters the room.

According to yet another exemplary embodiment of the present invention, an aircraft comprising a control device for shielding a room is provided.

Even if emitted radio signals may be emitted in a directional manner for example by base stations, base transceiver stations or BTSs, it may still happen that the radio signal also propagates in a certain area or region, respectively above the base station. Because of reflections or fading phenomena it may be encouraged that radio signals propagate to locations where the radio signals may cause interference.

Thus, it may also happen during passing or flying over a base station or over other types of radio stations that radio signals may also enter a room or the cabin of an aircraft which aircraft may be overflying this base station. If the wall of the cabin may be transmissive to radio signals or to electromagnetic waves or penetrable for radio signals, the cabin, and in particular the interior of the cabin, may be penetrated by the signals. Thus, in the interior of the cabin a transmission signal from a terrestrial base station may unintentionally appear.

Due to the partially very large distance between the aircraft and the radio source or base station and also due to attenuation phenomena during entering into the cabin interior or the interior of the room, weakening of the radio signals may occur.

An electronic terminal or an electronic end device, respectively which may be adapted for the communication with a corresponding base station, in particular a subscriber terminal, a subscriber end-device, a user equipment (UE), a personal digital assistant (PDA) or a mobile radiotelephone, or a cell phone, may be adapted such that on receiving a weak radio signal the mobile radio telephone may attempt to establish contact with this radio source by transmitting or sending, respectively a corresponding radio signal at high power. Due to the increased power that is used for connecting to the radio source and in particular to the base station, interference to electronic devices located in the aircraft may occur. This interference may be caused by the emission of electromagnetic radiation, which emission may lead to electromagnetic interference (EMI). This EMI in turn may lead to failure of a critical device on board the aircraft, like of a navigation device.

By shielding the signals entering the aircraft cabin from the outside it may be prevented, that a device used on board of an aircraft, i.e. in the interior of the cabin or of the room, may try registering with and logging into a remote or external radio network and in particular into a remote transmission station or base station with increased power.

However, it may be desirable that the use of a mobile subscriber terminal or the use of a subscriber end device by a passenger on board an aircraft may be possible. Thereby, it may be desirable that for the passenger the services may be provided with which the passenger is familiar by using the corresponding device on the ground. In other words, it may be desirable that services are offered to the passenger, which the passenger knows by using the corresponding device on ground. Apart from voice communication, such a service may be, for example, the short message service (SMS) or the multimedia message service (MMS) or another data service.

By a control device now the sending signal that may be present from a base station located outside the aircraft on the ground, or from a terrestrial base station, may be detected or identified and a corresponding interference signal may be determined or generated. Therefore, for example, the frequency used, the coding method used and/or the corresponding power of the incoming signal or entering signal, respectively may be determined or identified.

The control device may transmit or send the determined interference signal in the interior of the room so that by the emission of the interference signal the transmission signal which, for example, may be received from the ground or from outside the aircraft cabin, may no longer be recognised or detected or identified by a terminal or by an end device, respectively as being a valid signal. In other words, the control device may transmit or send the determined interference signal in the interior of the room so that by the emission of the interference signal, the sending signal or the transmission signal, which for example, may be received from the ground or from the outside the aircraft cabine, may no longer be recognised or detected or identified by a terminal or by an end device, respectively as being a valid signal. Consequently, the mobile terminal or mobile end device, respectively may no longer log into the external transmission source In contrast to this, on board the aircraft an additional base station may be provided which may send out a signal and which may cause a mobile terminal to establish contact with the additional base station. In other words this means that the mobile terminal may be made to believe that the base station located on board, i.e. the on-board base station, may be the only counter station or base station located close to the mobile terminal. Thereby, the terminal may log into the base station located on board or the on-board base station, whereby the terminal may become operable, controllable or adjustable by the base station. By the artificial interference of the signal entering from the outside, and by rendering this signal unrecognisable to the mobile terminal, the mobile terminal may only react to the control signals and radio signals of the on-board base station.

Since a mixture of several transmission signals may be formed in the interior of the room, the control device may also generate a corresponding combined interference signal so that all external sources may be rendered unrecognisable.

According to a further exemplary embodiment of the present invention, a control device is created in which the transmission signal is a mobile radio signal or a mobile phone signal, respectively. Thereby, the control device is equipped or adapted for a mobile radio system for an aircraft or for a mobile phone system for an aircraft, respectively.

With the use of a mobile radio signal that may follow a standard or a mobile radio signal according to a standard, the control device may be used for the use of a mobile radio terminal or a mobile phone or a cellular phone. Thus, the communication by a mobile radiotelephone may be made possible on board and may also be allowed. The mobile radiotelephone protocol used for the communication with a mobile radio terminal may also provide a control signal by which control signal the transmission power of a mobile telephone or mobile phone, respectively may be adjusted. Thus, by the base station the mobile telephone may be controlled, its transmission power may be reduced, or the mobile telephone may be switched off if required.

Since the control device may be adapted for a mobile radio system, the system may easily be integrated in an aircraft. Concerning the weight of the control device and concerning the installation dimensions of the control device, the control device may be adapted to the requirements of aircraft construction. Thereby, a light weight may be desirable. Furthermore, particular requirements concerning current terminals or power supply terminals, respectively and concerning power consumption in the design of the control device and as well in the design of the entire on-board mobile radio system or on-board mobile telephone system (OMTS) and of other interfaces may be tailored to aircraft construction. Conventional telephone infrastructure may operate at a voltage supply of +48V. In order to meet the requirements in an aircraft, the control device and all the other elements intended for the installation on board may be supplied with a voltage of 115V and with variable frequency.

According to a further exemplary embodiment of the present invention, a control device is created in which the mobile radio signal or the mobile phone signal or mobile radiotelephone signal, respectively may be selected from the group consisting of the mobile radiotelephone signals of a global system mobile (GSM)-signal, a code division multiple access (CDMA)-signal, a universal mobile telecommunications system (UMTS)-signal, a general packed radio service (GPRS)-signal, a high speed circuit switched data (HSCSD)-signal, a personal digital cellular (PDC)-signal, a universal wireless communications (UWC)-signal, an American mobile phone system (AMPS)-signal, an IS 95A-signal and a wireless local area network (WLAN)-signal.

With a control device that reacts such to a corresponding mobile radiotelephone signal it may be possible, also when overflying regions that may use different mobile radiotelephone standards or a mixture of radio standards, to react and to provide a corresponding interfering signal.

According to yet another exemplary embodiment of the present invention, a control device is provided, wherein the interference signal is a noise signal.

By a noise signal, interference to a wanted signal entering from the outside may be made unrecognisable to a mobile terminal so that the wanted signal may not be visible to a mobile terminal located on board. In other words, by a noise signal interference to a wanted signal entering from the outside may be made so that the wanted signal entering from the outside may be made unrecognisable to a mobile terminal. Thus, it may also be possible to achieve log-in at a desired base station when the transmission signal of the base station, for example of the on-board base station, may have more power than the interfered-with transmission signal, and thus, may be distinguishable from the interfered-with transmission signal. The interfered-with transmission signal, for example, may appear as a noise signal that may not contain any wanted information for a terminal or information useful to a terminal or payload information for a terminal.

Thereby the wanted signal or the useful signal of the corresponding desired base station may quasi jut out from the noisy ambient signal. Consequently a mobile telephone may orient at this jutting-out signal, i.e. a mobile telephone may find its bearings from this jutting-out signal and may register or log in, respectively, in a targeted manner, with the associated base station. Thereby, the noise signal may be white noise. However, other embodiments of a noise signal may also be imaginable.

By a noise signal it may be not only possible to interfere with a certain type of transmission signal of the ground station, but also when several different protocols may be present, these protocols may be interfered with at the same time. By a corresponding directional characteristic, the entire interior of the room or of the aircraft cabin may be filled with a corresponding counter-noise signal or a corresponding interference mobile radio signal so that the interior region of the room may essentially be shielded by rendering the incoming signals unrecognisable. However, by the noise signal, or by another interference signal, in a targeted manner certain bands of a mobile radio channel may be interfered-with. In the interior of the cabin or of the room, a noise carpet or a noise floor may emerge, from which only the desired base station may jut out.

According to another exemplary embodiment of the present invention, a control device is provided, wherein the interference signal is selected from the group consisting of a GSM-signal, a CDMA-signal, a UMTS-signal, a GPRS-signal, an HSCSD-signal, a PDC-signal, a UWC-signal, an AMPS-signal, an IS95A-signal and a WLAN-signal.

With the use of a correspondingly listed mobile radiotelephone protocol in a targeted manner only one corresponding type of a mobile radio network may be interfered with. Thus, it may be possible to refer to the nationally applying regulatory requirements of the countries that may be overflown by the aircraft. The different mobile radio protocols may be interfered with by different methods. Thereby, the method used to interfere with the mobile radio network of the corresponding country which country may be flown over may be made dependent on the region which may be flown over. In other words, thereby, the method used to interfere with the mobile radio network of the corresponding country over which the aircraft may fly may be made dependent on the region over which the aircraft may fly.

According to another exemplary embodiment of the present invention, a control device is created in which the interference signal is selectable depending on the received transmission signal. By the control device it may first be determined, which interfering transmission signals, for example of terrestrial transmitters, in the surroundings and/or in the interior of the room may exist. When the type of the transmission signal may have been determined, by a correspondingly selected interference signal that may be transmitted into the interior of the room region, in a targeted manner or intentionally interference of one received transmission signal or of the received transmission signal may be achieved. According to yet another exemplary embodiment of the present invention, an interference signal may be selectable from a database.

This database may, for example, be connected to a global positioning system (GPS) or to another navigation device of the aircraft so that with the aid of this navigation device it may be possible to determine which country may be flown over at the time or which country the aircraft may be flying over at the time. In the database an allocation may be made of country information to the correspondingly used and standardised mobile radio standards in the corresponding country. Thus, during flying over a country, an adaptation of the interference signal may be effected corresponding to the country that may be overflown at the time. Furthermore, thus a country-specific regulatory provision such as a maximum applicable power may be set up.

By a database it may also be determined where, i.e. in which country, the use of a mobile radiotelephone on board an aircraft may be permitted and in which flight phase the use of a mobile telephone or of another electronic radio terminal may be permissible. Thereby, factors such as the actually achieved altitude, or the square grid being overflown, may be taken into account and may be established via links of the database. In particular flight phases such as in the ascent phase or the descent phase using a mobile device may, for example, be prohibited.

According to yet another exemplary embodiment of the present invention, a control device is created, wherein the interference signal comprises a power, and this power of the interference signal may be adjustable such that the received transmission signal may be covered up by the interference signal, and as a result of this a noise signal may arise which may not contain any usable information. Thereby, the power of the interference signal may moreover be adjustable such that at the same time the signal of a local transmitting-receiving device may be receivable in the room.

By covering up the received external transmission signal, which may be entered the cabin, with the associated interference signal, the interior of a space may be shielded such that only the local transmitting-receiving device, which device may, for example, be on board the aircraft, is visible. The transmitting-receiving device may, for example, be a base station for a GSM- or UMTS-mobile radio network. With a corresponding number of base stations, a mobile radiotelephone network on board the aircraft may be established. This on-board mobile radio network may be comparable to a mobile radio network located on the ground. To the terminals or end devices, such an on-board mobile radio network may be transparent like a mobile radio network located on the ground.

Due to the proximity of the corresponding base station to a terminal on board the aircraft, wherein the base station in relation to the power may jut out beyond the interference signal, the electrical power of a connection between the terminal and the base station may be selected so as to be correspondingly low. Thereby, it may be prevented, that due to a power may be being too high, and the associated electromagnetic interference (EMI) or electromagnetic compatibility (EMC) factors of influence, interference with critical on-board instruments may be generated. Due to the fact that the base station, which to the on-board mobile telephone system (OMTS) may be a transmission system, is located on-board the aircraft, the electromagnetic interference (EMI) conformity may be specially considered. Thereby, the form and type of the particular aircraft may be taken into account.

By a test- and approval process it may be determined that the EMI specifications are met. In other words this means that neither the mobile radio station on board nor any other active and properly functioning system such as an antenna or the system itself may have an influence on aircraft systems whose criticality has been classified as being "major" even in the case that the mobile radio station or the other active and properly functioning system may not operate as specified. For example, an aircraft system whose criticality, for example, may be classified as being "major" may be navigation or communication.

According to another exemplary embodiment of the present invention, the control device may be connected to the local transmitting-receiving device or to the local base-stations or on-board base stations, respectively.

By connecting the local transmitting-receiving device to the control device, communication between the control device and the transmitting-receiving device may be made possible. Thus a connection or a relation, respectively between the interference signals and the corresponding power of the base station may be established.

According to a further exemplary embodiment of the present invention, the local transmitting-receiving device is a base transceiver station (BTS) or a base station for a mobile radio system or a base station for a mobile radiotelephone system.

The use of a BTS may render the use of the mobile communication for the mobile terminals transparent to the mobile communication deployed on the ground. The user or users therefore may do not have to accept any learning, adjustment or re-learning, respectively for the use of their mobile terminals on board an aircraft. Instead, for the user the use of the mobile terminal may turn out to be in the same manner as on ground. In other words, users may use their mobile terminals in the same manner as they do on the ground. A passenger (PAX) may thus also use the services of a mobile radio network that the passenger may know from use on the ground. For example, an SMS or GPRS or some other service may be used. Concerning the services used, it may also be possible to avoid that the user may have to adjust, re-learn or to get accustomed to a different routine. Thereby, the acceptance of the services that may be used on board may be increased.

According to yet another exemplary embodiment of the present invention, a control device is created, wherein the interference signal of the control device in conjunction with the local transmitting-receiving device may be settable or adjustable such that the radio frequency emission of a mobile terminal may be settable or adjustable from a mobile terminal. This means that the control device may provide the option of influencing the behaviour of a terminal. This control option or regulation option may be precluded if the terminals being connected to terrestrial base stations. If interference by a terminal may occur, the terminal may be switched off. In other words, if the terminal may cause any interference the terminal may be switched off.

By the control device or the on-board control equipment (OBCE), control signals may be sent to the BTS. The BTS may operate according to a mobile radio standard such as the GSM or UMTS systems. Within a mobile radio standard it may be provided for a base station to regulate the power with which a mobile terminal attempts to log into the corresponding base station. Since due to the interfered-with other external radio signals the on-board mobile terminals may all preferably log into the on-board BTS, it may thus be possible to realise a control of the mobile terminals used on board, e.g. by a mobile radiotelephone protocol. This may, for example, be useful if in a critical flight phase the shutdown or the reduction of the power of all the mobile terminals used on board may have to be achieved. Such uniform shutdown may, for example, take place from the cockpit, i.e. controlled from the cockpit.

According to yet another exemplary embodiment of the present invention, a control device is stated, wherein the transmitting device comprises an antenna for emitting the interference signal. By the antenna, interference signals may be distributed in a targeted manner in the interior of the room. By a directional antenna characteristic, and in particular with the use of a leaky line antenna or an electronically controlled array antenna, the room region in which transmission signals or sending signals, respectively may have to be interfered with may be defined. In other words this means that in the desired room regions an intruding external signal may be interfered with.

According to yet another exemplary embodiment of the present invention, the antenna is a leaky line antenna. A leaky line antenna may be an antenna that may be responsible for transmission and for transmitting and receiving from and to a device of a passenger, e.g. a mobile telephone, a laptop or a PDA. Thereby, it may also be possible to use several antennae. One antenna may be used for receiving and the other may be used for emitting the radio (RF) or the radio signal.

By the use of an electronically controllable antenna having a particular characteristic on the local base station, individual radio cells may be set up within the room or the cabin of the aircraft. Thus, particular areas, such as the first class or the business class, may be provided with a greater number of mobile radio channels than, for example, the economy class. The room may thus be subdivided into sub-rooms or sub-spaces, respectively.

According to yet another exemplary embodiment of the present invention, the control device further comprises a coordination device. The coordination device may be connected to the control device and the coordination device may be adapted such that the coordination device may control the control device.

Thereby, the coordination device may act independently of the control device, wherein the control device may be specialised for generating interference signals, while the coordination device may connect several subsystems with each other and may ensure an exchange of data between them.

According to yet another exemplary embodiment of the present invention, the coordination device furthermore may be connected to the local transmitting-receiving device. By this connection, which may for example be a voice-over-IP (VOIP) connection, an exchange of voice information between the transmitting-receiving device and the coordination device may take place.

Apart from controlling the control device, the coordination device may also allow forwarding of voice information from the base station.

According to yet another exemplary embodiment of the present invention, the coordination device comprises a satellite connection device or a satellite modem. The satellite connection device may, however, also be integrated in the transmitting device. By the satellite connection device a connection to a satellite transmission system may be established. With the satellite connection device, adaptation to the satellite channel may take place.

Thereby, the satellite connection device may be adapted such that a signal of the local transmitting-receiving device or of the on-board base station may be transmitted via a satellite connection. Thereto the coordination device may establish an interface to a satellite transmission system or a satellite connection or to a satellite channel. The voice information or data information, respectively that is destined for passengers on board, or that is generated by passengers on board, respectively, may thus be transmitted bundled, via a satellite connection, to a ground station and may be received by the earth station. Instead of connecting each mobile terminal that may would like to communicate on board the aircraft with a base station on the ground, this connection may be established via a fixedly set up link of the aircraft, via a satellite, to a specific ground station. The deployment of the satellite link may be an approved and EMI-safe device so that the deployment of which device for the connection may not have any influence or impact on the aircraft instruments. In other words, when using the satellite connection, this may be handled by a proven and EMI-safe device so that its use for the connection may not have any influence on any aircraft instruments.

Consequently the on-board power used for the communication with the on-board base station may happen at an essentially constant power level or at a weak power level, while the communication with the ground may also take place at a constant power level. Interference to the aircraft instruments may be avoided. The satellite connection device may, for example, be a satellite modem or a cabin satellite data unit (CSDU) by which a connection to the satellite connection may be established. By this satellite connection voice data of the base station, as well as control information for the control device or for the coordination device may be transmitted. Consequently the satellite connection may also be used to operate the coordination device and the control device from the ground.

According to yet another exemplary embodiment of the present invention, the coordination device comprises a flight attendant panel or a control desk. Thereby, the flight attendant panel (FAP) may be adapted such that the coordination device may be operated in the same manner as the control device. This operation may be independent of each other. By the flight attendant panel, it may be possible for the crew to manage a purposeful influence of the on-board devices. For example, by this flight attendant panel the system, and in particular the coordination device and the control device, may be put into a night mode that may make it possible to set up that essentially no voice transmission may be possible by the mobile terminals. Thus, nocturnal speech and a background noise caused by nocturnal speech may be prevented.

According to yet another exemplary embodiment of the present invention, the coordination device comprises a server. In the server or by the server it may be possible to provide various services such as, for example, e-mail services or internet access. By the server, it may also be possible to provide several standards. This provision may have influence when other mobile telephone standards, such as UMTS, CDMA or as well the GSM standard may be deployed, which standards may differ from the common standards such as GSM 1800 and GSM 1900, are demanded. In other words, this provision may have influence when other mobile telephone standards, such as UMTS, CDMA or as well the GSM standard may be demanded, which standards may differ from the common standards such as GSM 1800 and GSM 1900. The server may also have a function of informing the passengers as to when they are allowed to use their mobile telephones and when they are not allowed to do so. This may otherwise have to be carried out manually by the cabin crew. Thereby, the current flight phase may automatically be taken into account.

Many embodiments of the invention may have been described with reference to the control device. These embodiments may also apply to the system, the method and the aircraft.

Below, further exemplary embodiments of the invention are described with respect to the system for shielding a room. These embodiments also apply to the control device, the method and the aircraft.

According to yet another exemplary embodiment of the present invention, the system for shielding a room comprises a transmitting device. The transmitting device may be connected to the local transmitting-receiving device by the coordination device. Thereby, the transmitting device may be adapted such that the signal of the local transmitting-receiving device may be transmitted. By the transmitting device thus voice data or connection data from the aircraft, in particular from the room in an aircraft, may be transmitted to the ground.

According to yet another exemplary embodiment, the transmitting device comprises a satellite connection.

Thereby, for example, the satellite connection may be an Inmarsat satellite connection or a broadband global area network (BGAN) connection comprising the satellite modem (CSDU), the diplexer/low noise amplifier (DLNA) and an antenna, in particular an external antenna. Thus, even during the aircraft is in motion, voice data may be transported to the ground.

According to yet another exemplary embodiment of the present invention, the system for shielding a room comprises a communication network, wherein the communication network is connected to the transmitting device. In particular, the communication network may be connected to a network operation centre (NOC), which network operation centre may establish the connection to the satellite connection. Thereby, the communication network may be adapted such that the communication network may transmit the signal which signal the communication network may receive from the transmitting device. Thereby, the communication network may establish a separation between a voice service, a signalling service and a data service. By the signalling, an information exchange, such as, for example, concerning the establishment of a connection, may be set up via the communication network.

According to yet another exemplary embodiment, an aircraft comprising a control device, the control device having the above-mentioned features is stated. An aircraft may comprise a fuselage that may form a room or a space, respectively in which room signals that may enter from the outside may be shielded. Thus, the interior of the fuselage, and in particular the interior of a passenger cabin located in the interior of a fuselage, may be shielded from signals that enter from outside.

An aspect of the invention may consist of preventing a direct connection between mobile radio devices that are located on board an aircraft with base stations that are located on the ground and whose signals may enter the aircraft. Thereto, the radiation from terrestrial radio base stations which radiation may enter the aircraft from the outside, may be classified for the control device and the protocol used. In other words, the radiation from terrestrial radio base stations, which radiation may enter the aircraft from the outside may be investigated and classified for the control device according to the protocol used for the radiation. With this information an interference signal may be tailored such that the signals, which while being weak are nevertheless present, from the base station may disappear in a noise floor. A base station that may be located on board and that may transmit at a higher power than the power of the noise floor, may bind to itself almost all the mobile devices located on board, and may feed the traffic generated by these mobile radio devices in a bundled manner, via a reliable and interference-free satellite connection, into a terrestrial communication network. Thus, random and uncontrolled logging into possibly inwardly radiating terrestrial mobile radio networks and taking in of states in which states the mobile radio device may transmit at an excessive power or at an excessive level of power, respectively may be prevented.

BRIEF DESCRIPTION OF THE DRAWINGS

In the following, exemplary embodiments of the invention are described with reference to the figures.

DETAILED DESCRIPTION OF EXEMPLARY EMBODIMENTS

Figure 1:
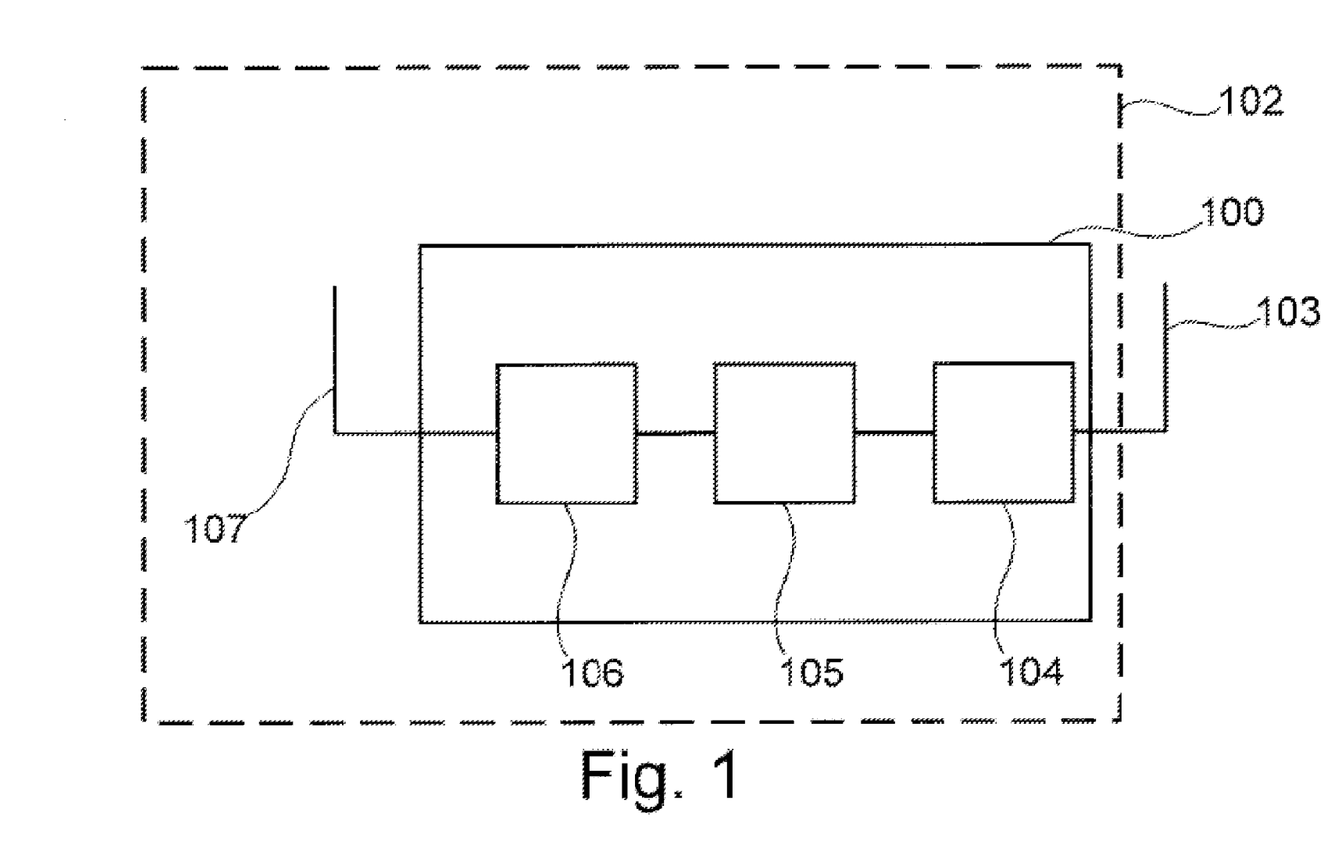
FIG. 1 shows a control device for shielding a room according to an exemplary embodiment of the present invention.

FIG. 1 shows a control device 100 that is arranged in a room 102 such that by a transmission signal receiving device or antenna 103 the control device can pick up or receive a transmission signal from a terrestrial source, which signal may be present outside or inside the room 102. The signals received by the antenna 103 reach the receiving device 104, which is arranged in the interior of the control device 100. In the receiving device 104 a remote technological reconditioning of the received transmission signal is effected and if necessary an amplification of the received transmission signal is effected. The reconditioned signal is forwarded by the receiving device 104 to the interference device 105, which is connected to the receiving device 104.

In the interference device 105, determination or identification of the present mobile radio signal takes place. For example, with the help of a database, querying of the required interference signal can take place. In the interference device 105 an interference signal is determined which interference signal corresponds to the conditions currently present. This interference signal is forwarded to the transmitting device 106 for the interference signal, which transmitting device by the antenna 107 transmits the interference signals into the interior of the room 102. By an antenna characteristic, in particular by a directional antenna or by a leaky line antenna, the interior room of the room or of the cabin 102 can be illuminated such that the interior room of the room 102 is free of any external transmission signals. In other words this means that the transmission signal is interfered within the room such that only a noise signal is present, from which noise signal the terminals can no longer derive any useful signal, a wanted signal or a payload signal.

Figure 2:
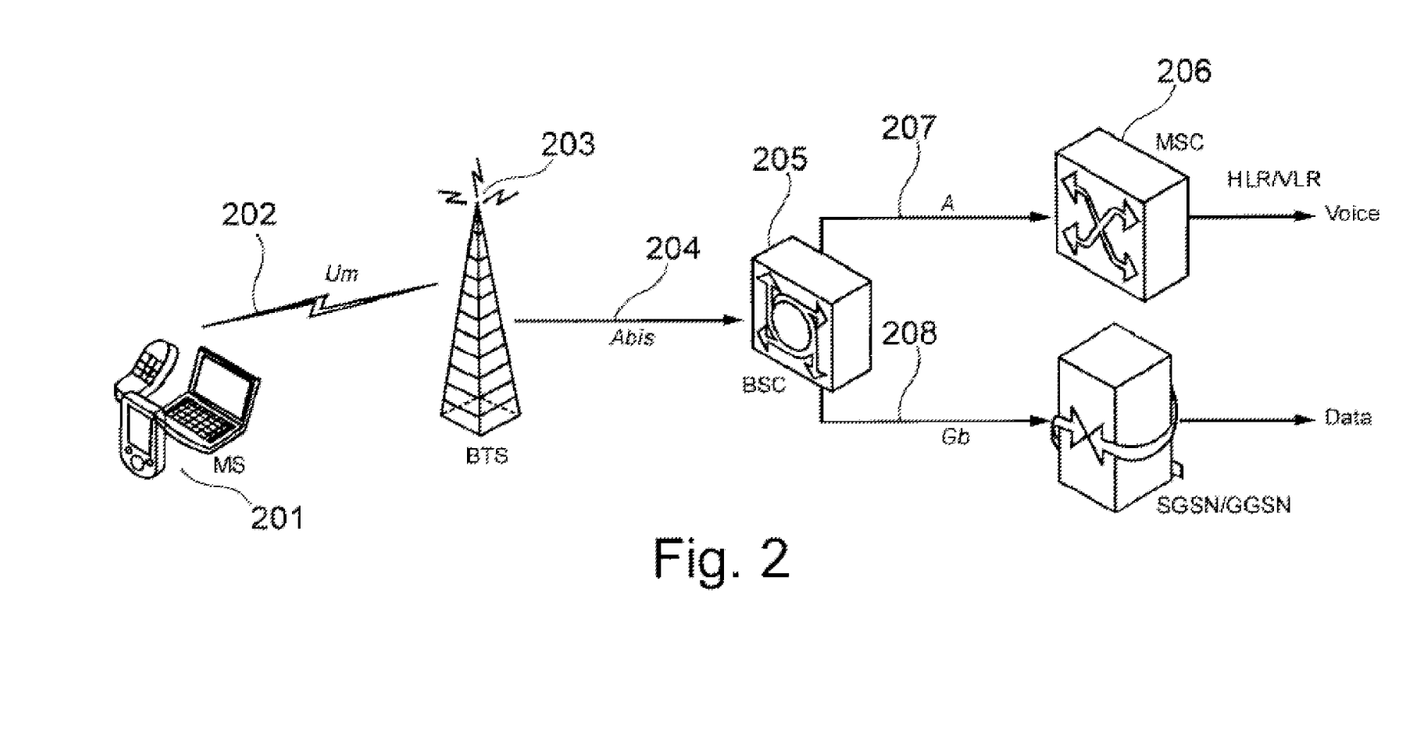
FIG. 2 shows the basic structure of a mobile radio network.

FIG. 2 shows the basic structure of a mobile radio network. The mobile radio network operates according to the GSM standard. By a GSM system, apart from the normal voice communication, an SMS service with, for example, a text message comprising up to 160 standard letters, an MMS service comprising text, images and sound information, or data communication that can be achieved by GPRS can be used. In order to provide these services in a GSM infrastructure, a mobile station (MS), a terminal equipment (TE), or a user equipment (UE) is provided, which equipment is a device prepared for GSM, for example a mobile telephone, a PDA, or a laptop computer. The MS 201 communicates via the air interface (Um) 202 with the base transceiver station (BTS) 203. From the BTS 203 the communication information is transmitted via the Abis interface 204 to the base station controller (BSC) 205. The BSC 205 controls one or several BTS 203.

A voice signal or an other connection-controlled information or circuit switched data, respectively, for example an SMS, is transmitted via the A-interface 207 to the mobile switching centre (MSC) 206 in that the user is identified by the home location register (HLR). The HLR is used for users that reside in this network, i.e. the HLR is used for users who are at home in this network. A roaming user originating from another network can also be identified in a visitor location register (VLR). Calls are switched either internally or to another mobile network or fixed network.

Packet-oriented data or packet switched data, for example GPRS connections or data parts of an MMS are transmitted via the Gb interface 208 to the network node which provides GPRS or which serves GPRS. This network node routes the data streams either into the intranet, to a walled garden, or to the public internet. Public destinations outside the system of the provider are provided by connections via so-called gateway GPRS support nodes (GGSN) or they are provided relating connections via so-called gateway GPRS support nodes (GGSN).

To provide an on-board mobile telephone service on board an aircraft, the GSM network infrastructure by/with a long-distance traffic communication link is connected to the ground station.

Figure 3:
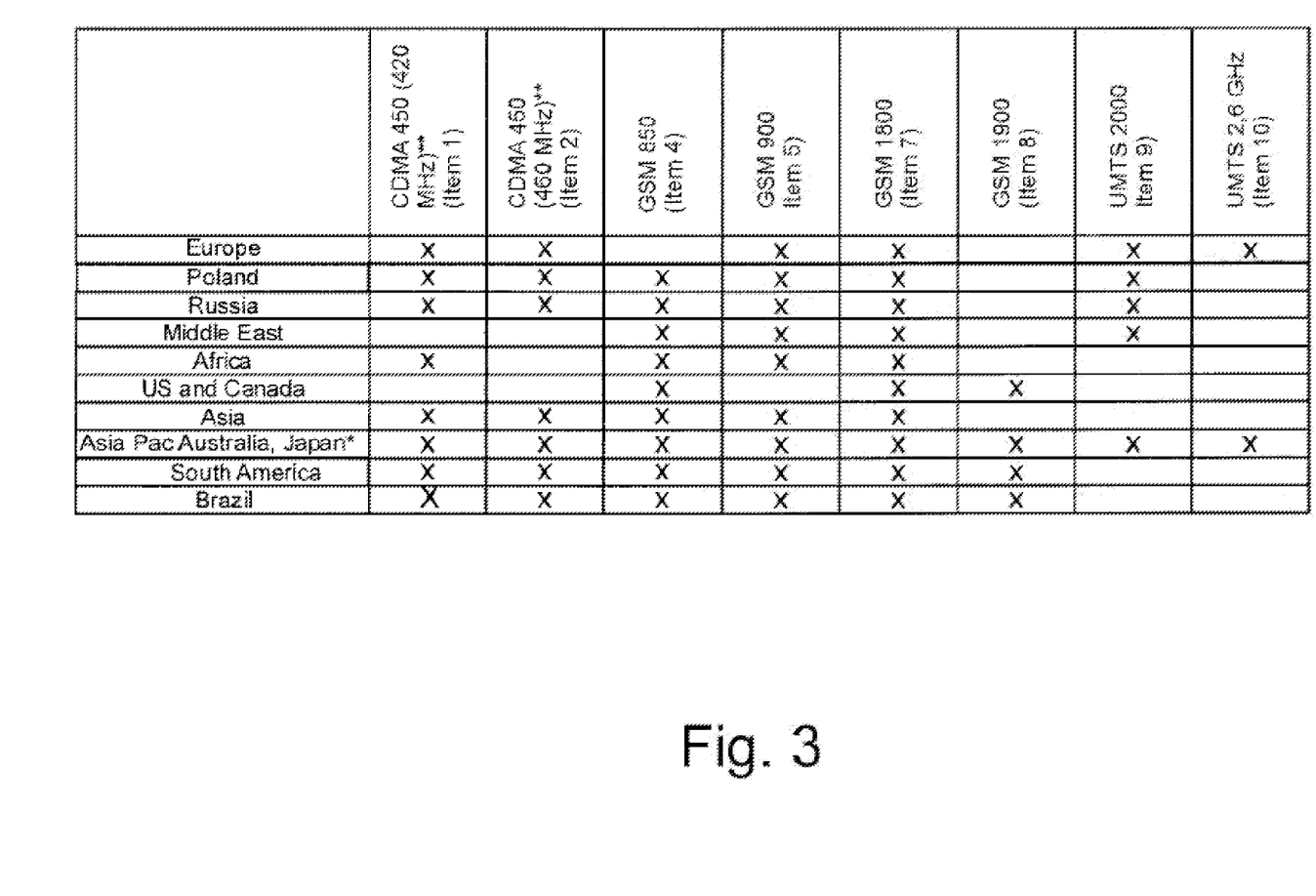
FIG. 3 shows an overview of frequency bands, used worldwide, according to an exemplary embodiment of the present invention.

FIG. 3 shows an overview of worldwide-used frequency bands according to an exemplary embodiment of the present invention. There are country-specific regulations relating to regulations and requirements concerning health and the certification of mobile radio devices. Since the present invention is to be installed on board an aircraft, additional considerations may have to be made or may have to be taken into account in relation to the fulfillment of requirements for regulation, the health of the on board crew of a flight and passengers, as well as certification.

The regulatory requirements or requirements for regulation of all the countries over which the aircraft possibly flies, or in which the OMTS is to be operated, are to be taken into account. Thus, the control device according to the invention can be installed in order to ensure that no on-board mobile telephone or mobile telephone on board, independent of the standard or the frequency used, has access to any terrestrial mobile radio network.

The OMTS can avoid that a mobile telephone emits a radio signal having a high power, wherein the high power would, for example, be necessary in order to reach a distant terrestrial network. Furthermore, the control device 100 allows that the BTS 203, which is located on board, not hase to transmit at a high power level. The BTS 203 can thus be the preferred point at which the MS 201 that are located on board register or log in. In addition it can be ensured that no MS 201 is used during a critical flight phase or in a region or at a time in which the use of a mobile telephone on board an aircraft is prohibited.

Moreover, in a particular country the use of a particular frequency may be prohibited. For example, GSM 1800 has not been released for use in the USA, and GSM 1900 has not been released for use in Europe. The prevention of high-powered radio signals is believed to be obligatory to comply with health requirements. In view of certification purposes, the emitted radio signals must not have a detrimental influence on the aircraft systems. Detrimental influence on the aircraft systems can also be prevented with the control device according to the invention. Parallel to the automatic deactivation of mobile telephones that are used on board, a passenger can be referred to the fact that the use of mobile terminals on board is temporarily prohibited by a display interdicting telephoning (e.g. "No telephone").

The control device 100 controls at least the frequency bands listed in the table shown in FIG. 3. Thereby regions designated as item 1, item 2, item 4, item 5, item 7, item 8, item 9 and item 10 are the main regions. It is believed that at the same time at least six frequency bands have to be controlled. The frequency range CDMA 450, which comprises the frequencies 420 MHz to 430 MHz and 460 MHz to 470 MHz is considered as two frequency bands.

FIG. 3 shows that today Europe uses the CDMA 450 (420 MHz) frequency band, the CDMA 450 (460 MHz) frequency band, the GSM 900, GSM 1800 and the UMTS 2000. Poland uses the CDMA 450 (420 MHz), CDMA 450 (460 MHz), GSM 850, GSM 900, GSM 1800 and UMTS 2000 frequency bands. Furthermore, the table in FIG. 3 shows that Russia uses the CDMA 450 (420 MHz), CDMA 450 (460 MHz), GSM 850, GSM 900, GSM 1800 and UMTS 2000 frequency band. The Middle East uses the frequency bands GSM 850, GSM 900, GSM 1800 and UMTS 2000, Africa uses the frequency bands CDMA 450 (420), GSM 850, GSM 900 and GSM 1800.

USA and Canada use GSM 850, GSM 1800 and GSM 1900, while Asia uses CDMA 450 (420 MHz), CDMA 450 (460 MHz), GSM 850, GSM 900, GSM 1800. The Asia-Pacific region, Australia and Japan use the frequency bands CDMA 450 (420 MHz), CDMA 450 (460 MHz), GSM 850, GSM 900, GSM 1800 and GSM 1900. It should be noted that in the regions Asia, Pacific and Australia no country has presently more than six frequency bands in use.

South America uses the frequency bands CDMA 450 (420 MHz), CDMA 450 (460 MHz), GSM 850, GSM 900, GSM 1800 and GSM 1900. Brazil also uses the same frequency bands as South America. For each country only one of the two CDMA 450 frequency bands is used. The control device is able to control both frequency bands at the same time. The entire system can be adapted such that the design assurance level (DAL) "C" is met. This level indicates that a failure of the system does not result in endangering the flight. Thus, it is required by the functional hazard analysis (FHA) for a single-aisle aircraft. This level is also met by Arinc's and Telenor's aero mobile system.

This level can be applied to all units and no redundancy is required. Even if the on-board control device is considered to be relevant to safety, with the signs or displays that show that the use of mobile devices is not permitted, the same status is achieved as can be achieved with a general prohibition of on-board mobile radio devices. Therefore it is believed that no redundancy is necessary.

During setup of the system it can be ensured that the quality of voice calls meet the requirements known from terrestrial connections. In order to meet these requirements regarding dimensioning of the on-board telephone system, for example the number of users that are concurrently able to make a call, and consequently the number of BTS 203 that are used on board, can be influenced. The selected mobile radio network operator should be responsible for making forecasts concerning dimensioning in relation to specific requirements of various aircraft types. Thus, for example, a BTS 203 has a capacity of 7 concurrent voice calls.

However, for long-haul aircraft, for example 2 BTS 203 for each GSM frequency can be regarded as necessary, which can provide 14 concurrent voice calls. Furthermore, it should be considered that adaptive multi rate (AMR) voice compression can be used. Voice compression may become a standard feature of mobile telephones within the next few years, as a result of which the channel capacity can be doubled when compared to the GSM standards. I.e. the maximum capacity of 28 concurrent voice connections can be achieved. Apart from mobile radiotelephony, further wireless technologies or radio technologies may be demanded by customers. These are mostly demanded based on the wireless LAN (WLAN) protocol that provides wireless radio-based access to a LAN.

In order to be able to provide both mobile telephony and wireless LAN, a combining system is used. Thereby, the use of a shared antenna system in the cabin can also be provided. This combining device is comprised in OBCE 100 and can provide the required and demanded mobile telephone standards. Furthermore, in the on-board backbone region, a flexible server system can support this provision of the plurality of standards. This is required if other mobile telephone standards as UMTS or CDMA and likewise GSM are demanded apart from GSM 1800 and GSM 1900.

Figure 4:
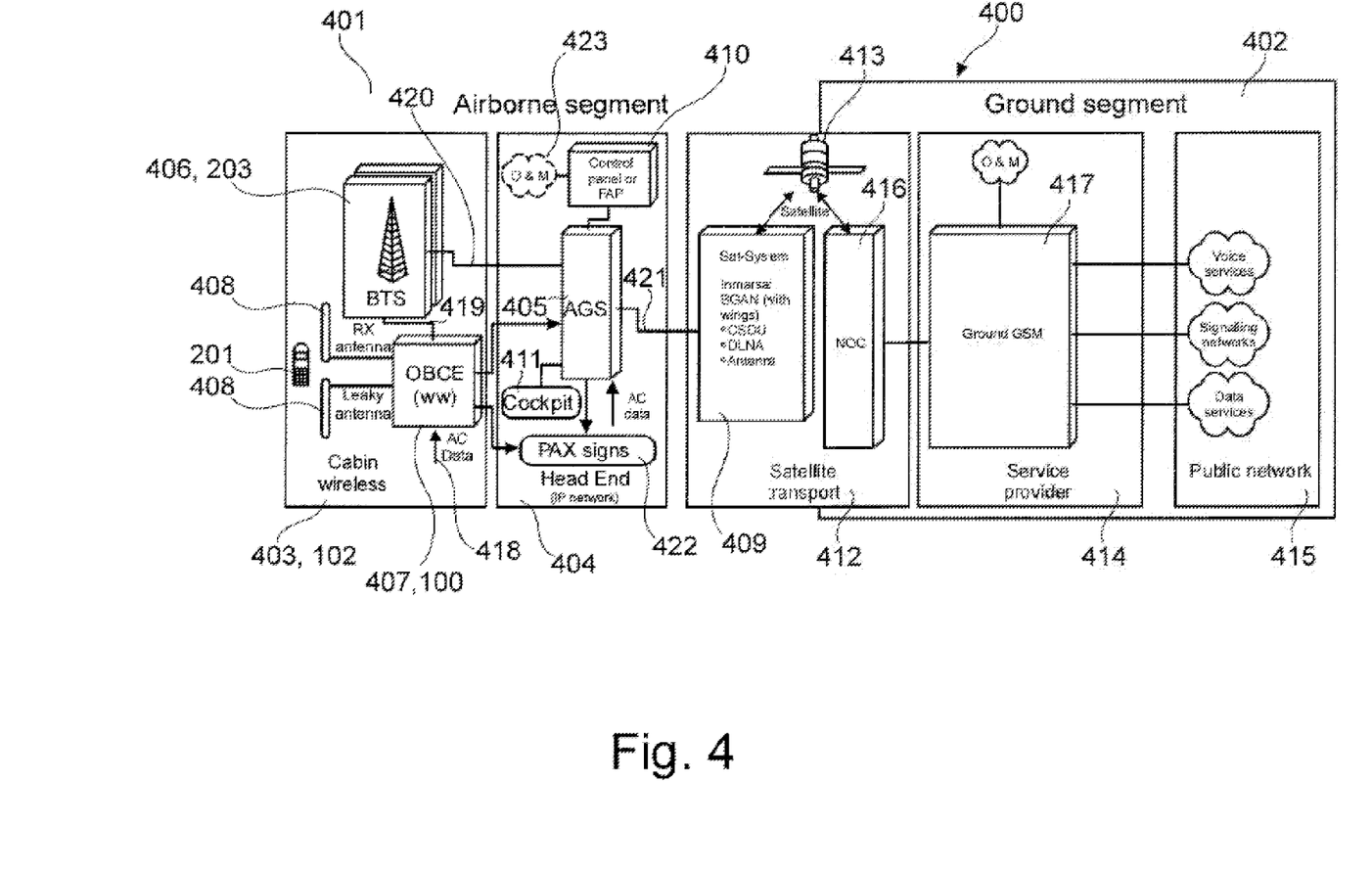
FIG. 4 shows an on-board mobile radio system according to an exemplary embodiment of the present invention.

FIG. 4 shows an on-board mobile radio system according to an exemplary embodiment of the present invention. The mobile radio system 400 of FIG. 4 may be, for example, a GSM on-board system. This GSM on-board system can provide several mobile telephone services for GSM 1800 and 1900 on board. FIG. 4 shows an overview of the various subsystems 403, 404, 412, 414 and 415. With reference to an end-to-end functionality, the overall system 400 can be divided into the airborne segment 401 and the ground segment 402, which segments in turn comprise so-called subdomains.

The on-board mobile telephone system architecture (OMTS) provides or supplies a connection between the airborne segment 401 and the ground segment 402 in the form of a satellite link 413 for the Abis interface 204 in order to connect one or several BTS 203, 406 that are located on board an aircraft, to the BSC 205 (not shown in FIG. 4), which is located on the ground. In contrast to all the other interfaces of the GSM infrastructure the Abis interface 204 is not completely standardised. Thus, it is believed to be advantageous to source the BTS 203 and the BSC 204 from the same manufacturer.

In the airborne segment 401 there are three subsystems, namely the cabin wireless- or room-wireless-subsystem 403, the head end subsystem 404 or the coordination device 404 with a centralised built-in test equipment (BITE), with a server 405 and with a communication management device. The third subsystem or the third sub-domain is the satellite transmission line 412, or the transmitting device 412, and in particular the satellite connection 413.

Between the subsystems there are unequivocally specified interfaces that allow independent changes and combinations of various systems.

The cabin wireless domain 403 provides passengers with a connection via various access points. The BTS 406, 203, which can be designed or dimensioned to be redundant, provides access for the mobile telephones 201 of the passengers to the GSM network. A GSM 1800 and a GSM 1900 BTS can be implemented in order to provide services in Europe or worldwide, respectively and in the US-GSM standard.

The control device (OBCE) 407 controls all the telephones 201 in the cabin 102 or in the room 102, respectively. The control device 407 together with the local BTS 406, 203 can control or regulate, respectively the radio frequency emission of all mobile telephones 201 and can prevent the mobile telephones 201 from attempting to connect the radio network outside the cabin or outside the aircraft (A/C) in the same manner as they prevent the mobile telephones 201 from connecting to the local BTS 406 during critical flight phases.

As an option, in addition to the mobile radio connection, a WLAN connection via a WLAN access device may be provided in the cabin wireless 403 or wireless cabin 403, via which WLAN connection the laptops 201 or the PDAs 201 of the passengers may be connected to the network.

The leaky line antennae 408 are antennae for transmitting and for sending and for receiving from and to devices, for example mobile telephones 201, laptops 201 and PDAs 201 of passengers. An antenna may be used as a receiving antenna while the other may be used as a transmitting antenna for the radio signal or as a sending antenna for the radio signal, respectively. Shared use of the antennae 408 for WLAN access and access to the mobile radio network may be possible.

The head-end domain 404 or coordination device 404 comprises a server capacity 405 for GSM services, which server capacity also has GSM software on board. For example, the software function can be a base station control functionality. Furthermore, the head-end domain 404 connects the mobile telephone system 403 to the satellite modem 409 (cabin satellite unit, CSDU) and the server capacity 405 for e-mail and other internet services. The server 405 can comprise a function to inform passengers whether or not they are allowed to use their mobile telephones. Otherwise this will have to be handled manually by the cabin crew.

In the head-end domain 404 there is also the flight attendant panel (FAP) 410. The FAP 410 is designed as a PC card. The FAP is the interface for the crew. Therewith, the status and possible errors of the system can be monitored. By the FAP the cabin crew can manually switch the system on and off and can also alter the level of GSM communication. This means that a presetting can be made about the power that will be used.

For example, a night mode can be set, in which may only data communication be possible. Thus, calm may be established in the aircraft. Furthermore, discrete interfaces such as a push button (PB) or as a switch are implemented, neither are shown in FIG. 4. This may allow, for example, to implement an interface to the cockpit 411. Via this interface the wireless function can be deactivated, or a system reset can be carried out.

A centralised cabin operation and maintenance system (OMS) 423 for maintenance provides a built-in test equipment (BITE) and the monitoring of all connected cabin equipments including satellite transport and the cabin wireless segment. This OMS functionality may allow to have simple malfunctions remedied by the cabin crew. Furthermore, the control of the necessary functions from a central point is possible. However, via a remote connection a remote maintenance can be carried out from a ground station with an extended functionality.

The cabin WLAN control and the cabin WLAN management, the communication management for air-to-ground traffic and the connection of the Ethernet cabin equipment 201 comprise a satellite communication with the cabin and a cabin wireless that is provided by the head-end domain 404 and in particular by the coordination device 404.

The satellite transport domain 412 or transmitting device 412 interconnects the airborne segment 401 and the ground segment 402. The satellite connection 413 provides the transport and the connection to service providers on the ground and to backbone networks 414, 415. Therein, by a satellite modem 409, an adaptation of the traffic generated by the server 405 to the satellite connection 413 takes place.

For example the satellite system Inmarsat swift broadband system can be used. The system is adapted to operation with the Inmarsat 4 satellite, which provides two swift broadband Inmarsat channels. Nonetheless, implementation with any other satellite system is also possible.

In order to provide end-to-end functionality some compatibilities are to be taken into account because the Abis interface 204 is a proprietary protocol. The ground segment 402 comprises a part of the satellite transport 412 or of the transmitting device 412, the service provider segment 414 and the public network 415. The network operation centre (NOC) 416 is the part of the transmitting device 412, that is comprised by the ground segment 402, which NOC may allow the operation of the satellite connection 413.

The ground satellite transport segment 416 is the counterpart of the airborne satellite segment 409, which establishes the connection to all service providers on the ground. The service provider domain 414 houses the communication control device, which cooperate with the on-board functions in the aircraft. Therefore, a ground server is provided. Carrying out of the routing in the direction of the aircraft and carrying out of the connection of the aircraft traffic with the traffic on the ground of the backbone network of the public network 414, 415 may be a main features of the ground server.

Instead, the service provider domain 414 comprises the accounting functions and billing functions, the mobility management and the routing functions, thus, an aircraft operator or airline, respectively can provide an own accounting system or billing system. The public land mobile network (PLMN) 415 comprises the BSC 205, MSC 206 and the VLR/HLR. The public network 415 additionally provides access to the remote terminals to which passengers may desire to establish a connection. This can, for example, be a public fixed network telephone or a public internet for the IP access. The ground units 416, 414, 415 provide all the functions and features of a classic mobile radio network, while the BTS 406 is set up in the aircraft or located in the aircraft, respectively, in particular in the aircraft cabin 403, and is connected to the main network 415 via a satellite link 413.

Within the cabin 403 by the antennae 408 interference can be generated, which interference keeps the interior of the cabin 403 free of transmission signals from terrestrial base stations, which transmission signals enter from the outside, in that the antenna 408 by superposition of an interference signal renders the useful information or wanted information or payload information of the entering signals unrecognisable. Thus, the MS 201 can directly establish contact with the BTS 406 that is located in the interior of the cabin 403. The interference is generated by the control device 407.

Aircraft data 418 is also fed to the control device 407. Thus, it is, for example, possible to take into account the flight position or the square grid over which the aircraft currently is flying. Via the connection 419 the control device 407 can control the BTS 406.

Via the redundant connection 420 the BTS 406 is connected to the server 405 (aircraft GSM server). Via the connection 420 an exchange of the received voice signals takes place by the voice-over-IP (VOIP) protocol. The server 405 can forward the received voice data via the IP connection 421 by the satellite modem 409 via the satellite connection 413.

The server 405 can also drive the signal device 422 which, for example, displays that no mobile radio devices must be used. The transmitting device 412 comprises the satellite connection 413. The head-end segment 404 is also referred to as the coordination device 404. In the communication network 415, partitioning into voice services, signalling messages and data services takes place. These can be distributed via separate virtual private networks.

Due to the modular design of the OMTS, the system can be retrofitted to any type of cabin. Consequently it is also possible, for example, to upgrade trains, buses, ships or trams with the OMTS.

Figure 5:
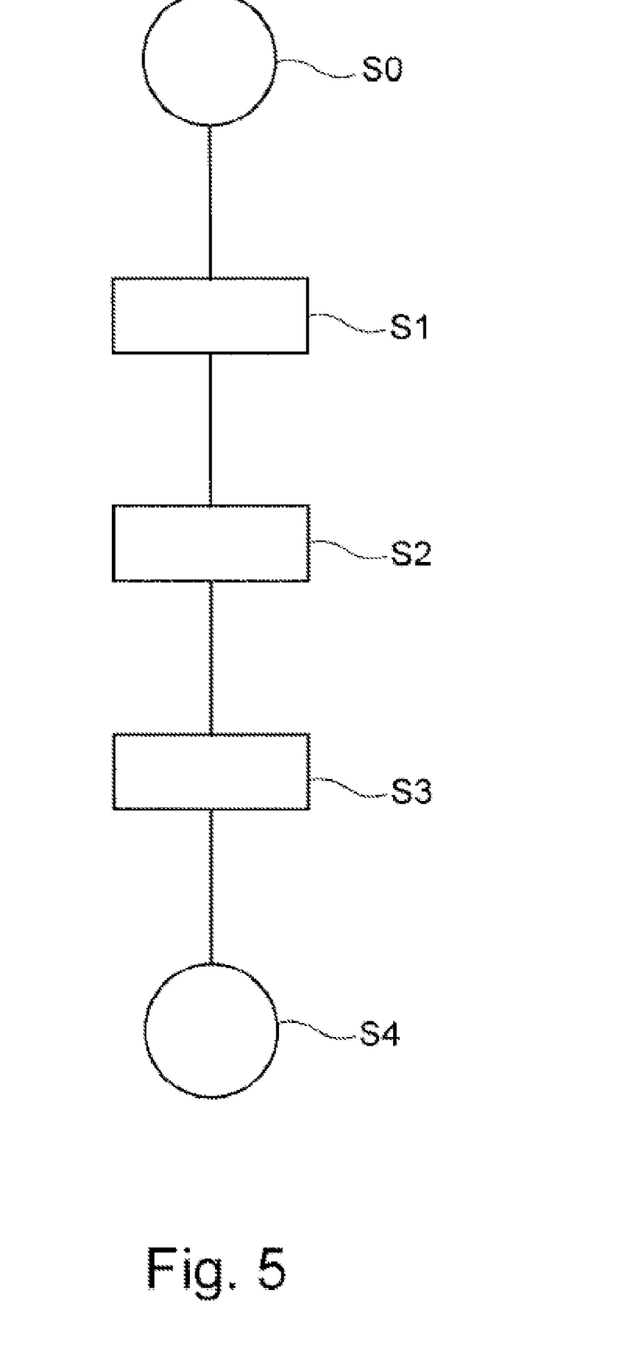
FIG. 5 shows a method for shielding a room according to an exemplary embodiment of the present invention.

FIG. 5 shows a method for shielding a room. The method starts in an initial state S0 and in S1 receives a transmission signal from terrestrial transmitting stations. This transmission signal is a radio signal. In step S2, from the transmission signal an associated interference signal is generated or determined that can render the received transmission signal invisible to terminals when the interference signal is emitted. In step S3 this determined interference signal is emitted into the interior of the cabin so that in the interior of the cabin a noise floor is created from which only the existing local transmitting-receiving device juts out. After this the method assumes the final state of S4.

In addition, it should be noted that "comprising" does not exclude other elements or steps, and "a" or "an" does not exclude a plurality. Furthermore, it should be noted that features or steps which have been described with reference to one of the above exemplary embodiments can also be used in combination with other features or steps of other exemplary embodiments described above. Reference signs in the claims shall not be construed as limitations.

According to an aspect of the invention in the method for shielding a room the received transmission signal may be a mobile radio signal.

According to another aspect of the present invention the method for shielding a room may further comprise emitting a noise signal.

According to another aspect of the present invention the method for shielding a room may further comprise emitting the interference signal that may be selected from the group consisting of a GSM signal, CDMA signal, UMTS signal, GPRS signal, HSCSD signal, PDC signal, UWC signal, American mobile phone system signal, IS95 A-signal and a wireless local area network-signal.

According to another aspect of the present invention the method for shielding a room may further comprise selecting the interference signal from a database.

According to another aspect of the present invention the method for shielding a room may further comprise selecting a power of the interference signal such that the received transmission signal may be covered and selecting the power of the interference signal such that the signal of a local transmitting-receiving device may be receivable in the room.

According to another aspect of the present invention the method for shielding a room may further comprise adjusting the interference signal by the control device in conjunction with a local transmitting-receiving device such that the radio frequency emission of a mobile terminal may be adjustable.

According to another aspect of the present invention the method for shielding a room may further comprise adjusting a signal of the local transmitting-receiving device to a satellite connection and transmitting the signal of the local transmitting-receiving device via the satellite connection.

According to another aspect of the invention the transmission signal is a mobile radio signal and the control device is adapted for a mobile radio system for an aircraft.

According to another aspect of the invention the interference signal has a power, wherein the power of the interference signal is adjustable such that the received transmission signal is covered up and wherein the power of the interference signal is adjustable such that the signal of a local transmitting-receiving device is receivable in the room.

According to another aspect of the invention the interference signal is adjustable by the control device in conjunction with the local transmitting-receiving device such that the radio frequency emission of a mobile terminal is adjustable.

According to another aspect of the invention, a system for shielding a room is provided, comprising the control device and a transmitting-receiving device, wherein the control device is adapted for receiving a transmission signal, wherein the transmission signal is a radio signal and wherein the control device is adapted to determine an interference signal from the received transmission signal so that when the interference signal is emitted, the transmission signal is interfered with such, that a signal of the transmitting-receiving device is distinguishable from the interference signal, wherein the control device is adapted to emit the determined interference signal.

According to another aspect of the invention, the system further comprises a transmitting device, wherein the transmitting device is connected to the transmitting-receiving device by the coordination device and wherein the transmitting device is adapted for transmitting the signal of the transmitting-receiving device.

According to another aspect of the invention, the system further comprises a communication network, wherein the communication network is connected to the transmitting device and wherein the communication network is adapted for transmitting the signal of the transmitting device.

The invention claimed is:

1. A control device for shielding a room, the control device comprising:
   a navigation device for determining aircraft data;
   an interference device;
   a transmitting device for transmitting an interference signal;
   a data base for querying the interference signal;
   wherein the database is connected to the navigation device;
   wherein the interference device is adapted, for querying the interference signal with the help of the database, which interference signal corresponds to a condition currently present; and
   wherein by the interference signal a signal entering the room can be rendered unrecognisable by superposition with the interference signal;
   wherein for the generation of the interference signal the aircraft data are taken into account;
   wherein the transmitting device is adapted to emit the generated interference signal.

2. The control device of claim 1, further comprising a connection to a local transmitting-receiving device, wherein the control device can influence the behaviour of a terminal via the connection.

3. The control device of claim 1, wherein the entering signal is selected from the group consisting of a GSM signal, CDMA signal, UMTS signal, GPRS signal, HSCSD signal, PDC signal, UWC signal, American mobile phone system signal, IS 95 A-signal and a wireless local area network-signal.

4. The control device of claim 1, wherein the interference signal is a noise signal.

5. The control device of claim 1, wherein the interference signal is selected from the group consisting of a GSM signal, CDMA signal, UMTS signal, GPRS signal, HSCSD signal, PDC signal, UWC signal, American mobile phone system signal, IS 95 A-signal and a wireless local area network-signal.

6. The control device of claim 1, wherein the control device is adapted for the integration in an aircraft.

7. The control device of claim 1, wherein the interference signal has a power;
   wherein the power of the interference signal is adjustable such that the signal entering the room is covered up; and
   wherein the power of the interference signal is adjustable such that the signal of a local transmitting-receiving device is receivable in the room.

8. The control device of claim 1, wherein the transmitting device comprises an antenna for emitting the interference signal.

9. The control device of claim 8, wherein the antenna comprises a leaky line antenna.

10. The control device of claim 1, further comprising a coordination device;
    wherein the coordination device comprises a flight attendant panel;
    wherein the flight attendant panel is adapted for operating the coordination device and/or the control device.

11. A system for shielding a room, comprising:
    a control device comprising:
    a navigation device for determining aircraft data;
    an interference device;
    a transmitting device for transmitting an interference signal;
    a data base for querying the interference signal;
    wherein the database is connected to the navigation device;
    wherein the interference device is adapted, for querying the interference signal with the help of the database, which interference signal corresponds to a condition currently present; and
    wherein by the interference signal a signal entering the room can be rendered unrecognisable by superposition with the interference signal;
    wherein for the generation of the interference signal the aircraft data are taken into account;
    wherein the transmitting device is adapted to emit the generated interference signal;
    a transmitting-receiving device;
    wherein the control device is adapted to determine the interference signal such that when the interference signal is emitted, the entering signal is interfered with such, that a signal of the transmitting-receiving device is distinguishable from the interfered-with signal.

12. A method for shielding a room, comprising:
    connecting a database to a navigation device;
    determining aircraft data with the navigation device;
    querying an interference signal with the help of the database, which interference signal corresponds to a condition currently present;
    wherein by the interference signal a signal entering the room can be rendered unrecognisable by superposition with the interference signal;
    wherein for the generation of the interference signal the aircraft data are taken into account;
    emitting the generated interference signal.

13. An aircraft comprising:
    a control device comprising:
    a navigation device for determining aircraft data;
    an interference device;
    a transmitting device for transmitting an interference signal;
    a data base for querying the interference signal;
    wherein the database is connected to the navigation device;
    wherein the interference device is adapted, for querying the interference signal with the help of the database, which interference signal corresponds to a condition currently present; and
    wherein by the interference signal a signal entering the room can be rendered unrecognisable by superposition with the interference signal;
    wherein for the generation of the interference signal the aircraft data are taken into account;
    wherein the transmitting device is adapted to emit the generated interference signal;
    or the aircraft comprising a system for shielding a room, comprising:
    a control device comprising:
    a navigation device for determining aircraft data;
    an interference device;
    a transmitting device for transmitting an interference signal;
    a data base for querying the interference signal;
    wherein the database is connected to the navigation device;
    wherein the interference device is adapted, for querying the interference signal with the help of the database, which interference signal corresponds to a condition currently present; and
    wherein by the interference signal a signal entering the room can be rendered unrecognisable by superposition with the interference signal;
    wherein for the generation of the interference signal the aircraft data are taken into account;
    wherein the transmitting device is adapted to emit the generated interference signal;
    a transmitting-receiving device;
    wherein the control device is adapted to determine the interference signal such that when the interference signal is emitted, the entering signal is interfered with such, that a signal of the transmitting-receiving device is distinguishable from the interfered-with signal.

* * * * *